No. 879,930. PATENTED FEB. 25, 1908.
W. P. WIEMANN.
PURIFYING DEVICE FOR STEAM BOILERS.
APPLICATION FILED SEPT. 28, 1907.

2 SHEETS—SHEET 2.

UNITED STATES PATENT OFFICE.

WILLIAM P. WIEMANN, OF ALLEGHENY, PENNSYLVANIA, ASSIGNOR TO WIEMANN-MUNHALL COMPANY, OF PITTSBURG, PENNSYLVANIA, A COPARTNERSHIP.

PURIFYING DEVICE FOR STEAM-BOILERS.

No. 879,930.     Specification of Letters Patent.     Patented Feb. 25, 1908.

Application filed September 28, 1907. Serial No. 394,991.

*To all whom it may concern:*

Be it known that I, WILLIAM P. WIEMANN, residing at Allegheny, in the county of Allegheny and State of Pennsylvania, a citizen of the United States, have invented or discovered certain new and useful Improvements in Water-Purifying Devices for Steam-Boilers, of which improvements the following is a specification.

In Letters Patent Nos. 826,811 and 852,055, dated respectively July 24th, 1906, and April 30th, 1907, I have described and claimed certain improvements in water purifying apparatus for boilers consisting generally stated in a pump for causing water to flow from a boiler through suitable filtering material and back into the boiler, whereby solid matter held in suspension in the water is removed. In the apparatus covered by said patents provision is made for cleaning the filter by causing a reverse flow of water through the filter, whereby the foreign material caught by the filter is forced out through the cleaning outlet.

The invention described herein has for its object the provision of suitable means automatically operative when the clogging of the filter causes a predetermined resistance to the flow of water, to cause a reversal of flow through the filter to clean the same, the normal operation of the filter being restored as soon as a proper cleaning has been effected.

The invention is hereinafter more fully described and claimed.

Figure 1:
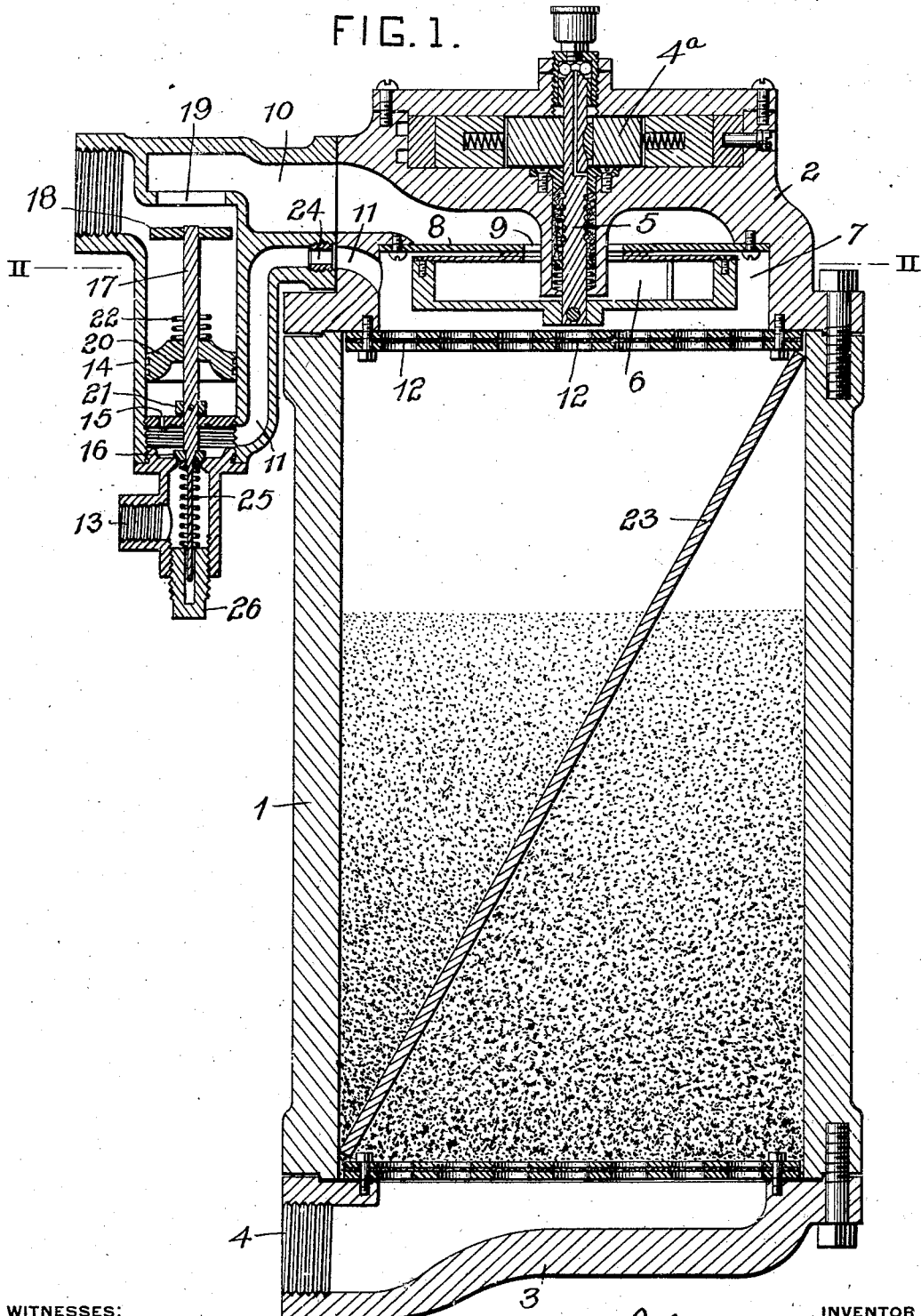
Figure 2:
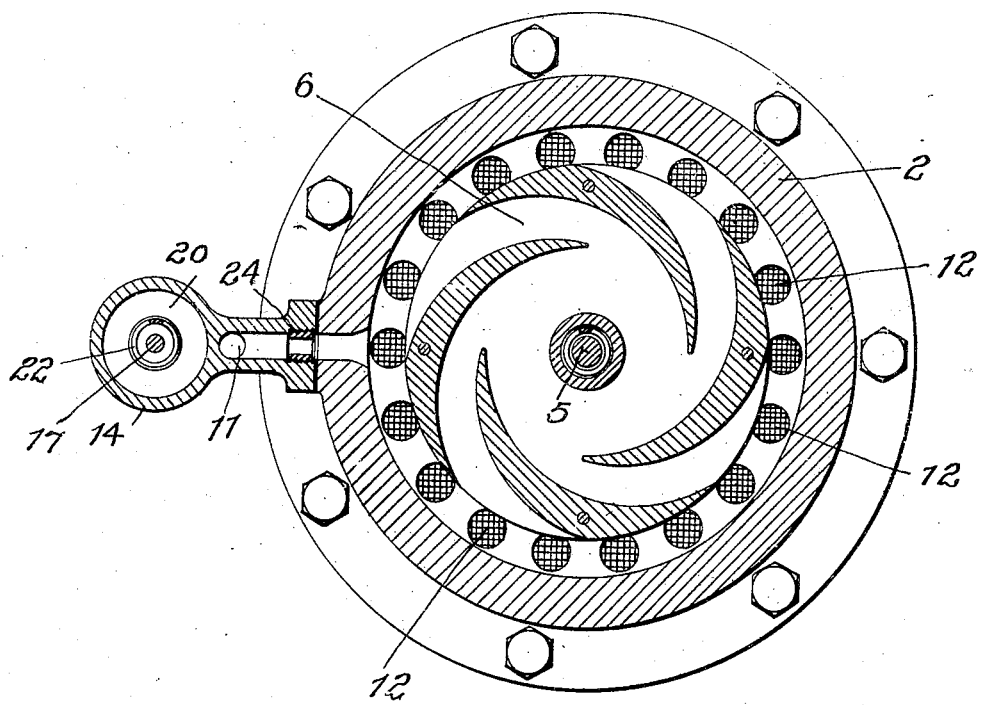

In the accompanying drawings forming a part of this specification Figure 1 is a sectional elevation of a water purifying apparatus for boilers embodying my improvements, and Fig. 2 is a sectional plan on a plane indicated by the line II—II Fig. 1.

In the practice of my invention, the filtering material as sand, etc., is placed in a shell 1, preferably provided with removable heads 2 and 3. The lower head 3 is provided with an outlet passage 4 which is adapted to be connected to the boiler at a suitable point. The head 2 is provided with a chamber forming cylinder for the rotary member 4ᵃ which can be of any suitable construction. The shaft 5 of the rotary engine is connected to a centrifugal pump 6 of any suitable construction but preferably having its blades curved as shown in Fig. 2. This pump is located in a chamber 7 formed in the head 2, a diaphragm 8 arranged across the chamber above the pump and provided with a central opening 9 to direct the water from the boiler to the center of the pump. This diaphragm will prevent any increase above boiler pressure by the back flow of water around the pump into the passage 10 which is connected to the boiler at a point below the normal water level.

In the operation of this apparatus, water is drawn by the pump 6 from the boiler through the passage 10 and is forced down through the filtering material back into the boiler. In time, dependent on the amount of solid material held in suspension in the boiler, the filter will become clogged, and the foreign material caught by it, must be removed. This is effected by closing the inlet passage 10 and opening a discharge passage 11 communicating with the chamber 7 at a point above the screen 12, employed for preventing the escape of the filtering material. The closing of the inlet port and opening of the discharge has heretofore been done manually, but when used in connection with some boilers, as locomotive boilers, the filter is necessarily placed so as to be inaccessible except when the locomotive is stationary, and hence the filter when manually controlled cannot be cleaned as frequently as desirable. In order to provide for frequent cleaning, means are provided whereby the cleaning may be effected automatically whenever a certain degree of clogging is attained.

The discharge passage 11 is connected to a port 13 which is preferably located at one end of a cylinder 14 so that fluid from the passage can flow into the cylinder through a small port 15. The valve 16 controlling the port 13 is secured to a rod 17 passing through the cylinder and having a valve 18 secured to its opposite end, said valve being adapted to control the port 19 through which water flows from the boiler through the passage 10. A piston 20 is adapted to move back and forth in the cylinder, but is not connected to the rod or stem 17, which it can however shift to close port 13 and open port 19, by striking a shoulder 21 on the rod as hereinafter described. The shifting of the valves 16 and 18 to close and open respectively, ports 19 and 13, is effected by the piston operating through an abutment formed by a spring 22 interposed between the valve 18 and piston 20.

In describing the operation of the automatic control it will be supposed that the filter has been cleaned and the parts in the position shown in Fig. 1. By the flow of water through the filtering material, it will become gradually clogged and consequently there will be a gradual increase above boiler pressure in the chamber 7, discharge passage 11 and, as the port 15 is constantly open, in the cylinder below the piston 20, thus causing the piston to move up compressing the spring 22.

The valves will be held in the positions shown, by pressure in the passage 11 against valve 16, until the movement of the piston has placed the spring 22 under sufficient tension to overcome this pressure, and shift the valves 16 and 18 the one to open and the other to closed position. The closing of port 19 cuts off the flow of water from the boiler to the passage 10 and pump 6, but as the lower portion of the filter is still connected with the boiler, the water will flow from the latter up through the filtering material and out through the discharge passage 11 and port 13, thereby removing the foreign clogging material from the filter. The opening of valve 16 will permit of a lowering of pressure by leakage through port 15 below that in the boiler in the portion of the cylinder 14 below the piston, and as the upper side of the piston is exposed to boiler pressure, it will be forced down, its rate of movement being dependent on the size of the port 15. In its return movement, the piston will strike against the abutment 21 and force valve 16 to its seat and open the valve 18, whereupon the filter will resume its normal operation.

It has been found that the mud, etc., seems to act as a binder to the filtering material, so that when pressure is cut off from above, as by the closing of port 19 and the port 13 opened the pressure at the lower end will force the mixed filtering and foreign materials bodily up against the screen 12. This plug will break up slowly to permit of the washing out of the foreign materials, In order to prevent the mixed filtering and foreign materials from thus retaining this integral condition, an obstruction is arranged in the filter in such position that on the upward movement of the filtering material it will be broken up and water allowed to pass through. This breaker can conveniently be in the form of a strip of metal 23 arranged diagonally in the shell 1.

The rate of flow of water in reverse direction should be proportioned to the quality of the filtering material, the finer the material the slower should be the rate of flow, and to this end the capacity of the passage 11 is regulated by a removable bushing 24 in accordance with the grade or quality of the filtering material.

When the discharge port 13 is considerably contracted, the reduction of pressure in the filter will be small and there will not be sufficient difference of pressure on opposite sides of the valve 18 to insure the retention of said valve in closed position and the valve 16 in open position. Any tendency of the valves 18 and 16 to move will however be counteracted by the action of the pump which is kept in operation, while the filter is being cleaned, and by its operation will so reduce the pressure in the passage 10 materially below boiler pressure.

As heretofore stated the combined areas of the upper surfaces of the piston and the valve 16 are greater than the area of the underside of the piston and hence the valve 16 will remain closed until sufficient pressure has been generated in the cylinder to overcome boiler pressure on the upper surface of the piston and filter pressure on the valve. In such a construction, the valves 16 and 18 will be shifted to clean the filter at a certain fixed filter pressure. In order to permit of the shifting of these valves at a different pressure the valve 16 is made of such a relative area that it will be opened only when a predetermined maximum pressure has been produced in the manner stated in the passage 11 and cylinder 14, and in order to permit of the opening of valve 16 at a less pressure, a spring 25 is interposed between the valve and an adjustable abutment 26. By changing the tension of this spring the valve will be opened as soon as any desired pressure above boiler pressure has been produced by the clogging of the filter.

I claim herein as my invention:

1. In an apparatus for purifying the water in boilers, the combination of a filter, means for causing the water to flow from the boiler through the filter and back into the boiler, and means operating automatically to reverse the flow of water through the filter to a suitable discharge port.

2. In an apparatus for purifying the water in boilers the combination of a filter, means for causing the water to flow from the boiler through the filter and back into the boiler, and means operating automatically on a predetermined increase of resistance in the filter to the normal flow of water to cause a reverse flow through the filter to a suitable discharge port.

3. In an apparatus for purifying the water in boilers the combination of a filter, means for causing water to flow from the boiler, through the filter and back into the boiler, valves controlling the flow of water to and from the filter through a discharge port, and adapted to be shifted to close the inlet and open the discharge port on an increase of resistance to the normal flow of water through the filter.

4. In an apparatus for purifying the water in boilers, the combination of a filter, having at opposite ends inlet and an outlet connection to the boiler, and provided with a discharge port means for causing the water to flow from the boiler through the filter and back to the boiler, valves controlling the inlet and discharge port, a piston adapted in its movement to shift said valves and subjected on one side to normal boiler pressure and on the opposite side to an increased pressure due to resistance presented by the filter to the normal flow of water.

5. In an apparatus for purifying the water in boilers the combination of a filter having inlet and discharge ports at one end and an outlet port at the opposite end, means for causing water to flow from the boiler through the filter and through the outlet to the boiler, valves controlling the discharge and inlet ports on the same end, a cylinder connected at its opposite ends to the inlet and discharge passages or ports, a piston arranged in said cylinder and adapted in its movements to simultaneously shift the valves controlling said ports.

6. In a filtering apparatus the combination of a shell or cylinder containing filtering material, means for causing a flow of water through said filter, means for causing a reverse flow of water through the filter and means for breaking up the filtering material when shifted on a reverse flow of the water.

7. In a filtering apparatus the combination of a shell containing filtering material, having inlet and outlet ports at its opposite ends, and a bar arranged across the filter so as to break up the filtering material when shifted by a reverse flow of the water therethrough.

8. In an apparatus for purifying the water in boilers, the combination of a filter, means for causing water to flow from the boiler through the filter and back to the boiler, a valve controlling the flow of water to the filter a valve controlling the discharge from the filter said valves being adapted to be shifted to close the inlet and open the outlet on an increase of pressure in the filter above boiler pressure, and means permitting the opening of the discharge valve at any desired pressure.

In testimony whereof, I have hereunto set my hand.

WILLIAM P. WIEMANN.

Witnesses:
CHARLES BARNETT,
J. HERBERT BRADLEY.